United States Patent
Dämgen et al.

(10) Patent No.: US 9,404,512 B2
(45) Date of Patent: Aug. 2, 2016

(54) SYSTEM FOR STORING ENERGY BY MEANS OF COMPRESSED AIR

(75) Inventors: Ulrich Dämgen, Iserlohn (DE); Wolf D. Meier-Scheuven, Bielefeld (DE)

(73) Assignee: BOGE KOMPRESSOREN OTTO BOGE GMBH & CO. KG, Bielefeld (DE)

( * ) Notice: Subject to any disclaimer, the term of this patent is extended or adjusted under 35 U.S.C. 154(b) by 272 days.

(21) Appl. No.: 14/342,552

(22) PCT Filed: Sep. 5, 2012

(86) PCT No.: PCT/EP2012/003704
§ 371 (c)(1),
(2), (4) Date: Mar. 24, 2014

(87) PCT Pub. No.: WO2013/034284
PCT Pub. Date: Mar. 14, 2013

(65) Prior Publication Data
US 2014/0238022 A1   Aug. 28, 2014

(30) Foreign Application Priority Data

Sep. 5, 2011   (DE) .......................... 10 2011 112 280

(51) Int. Cl.
*F15B 1/02* (2006.01)
*F02C 1/10* (2006.01)
(Continued)

(52) U.S. Cl.
CPC . *F15B 1/024* (2013.01); *F02C 1/02* (2013.01); *F02C 1/10* (2013.01); *F02C 6/16* (2013.01); *F02G 1/043* (2013.01); *F03D 9/17* (2016.05); *Y02E 10/72* (2013.01); *Y02E 60/15* (2013.01)

(58) Field of Classification Search
CPC ............ F15B 1/024; F02G 1/043; F02C 1/10; F02C 1/02; F02C 6/16; F03D 9/028; Y02E 60/15; Y02E 10/72

USPC ................................ 60/659; 290/1 R, 4 R, 52
See application file for complete search history.

(56) References Cited

U.S. PATENT DOCUMENTS

| 4,281,256 A | 7/1981 | Ahrens |
| 2010/0162702 A1* | 7/2010 | Bennett ................. B64C 39/024 60/659 |

(Continued)

FOREIGN PATENT DOCUMENTS

| CN | 101023253 A | 8/2007 |
| CN | 101289963 A | 10/2008 |

(Continued)

OTHER PUBLICATIONS

State Intellectual Property Office of the People'S Republic of China, Notification of the First Office Action (on a related application), Aug. 4, 2015.

*Primary Examiner* — Hoang Nguyen
(74) *Attorney, Agent, or Firm* — Laurence P. Colton; Smith Tempel Blaha LLC

(57) ABSTRACT

A plant for storing energy by means of compressed air, in which: a storage volume accommodates air at elevated pressure $p_H$; for energy storage, ambient air is compressed and introduced into the storage volume; for removal from storage, compressed air is extracted from the storage volume and discharged into the environment, performing work; at least one low-pressure turbomachine for alternate compression and expansion respectively compresses ambient air to a medium pressure $p_M$ and expands said ambient air from said pressure; at least one high-pressure machine for alternate compression and expansion respectively compresses air from the medium pressure $p_M$ to the store pressure $p_H$ and expands said air from the latter pressure; and said low-pressure turbomachine and high-pressure machine are connected in series in terms of flow and are mechanically coupled to in each case one, or to one common, electric machine that operates selectively as a motor and generator.

17 Claims, 3 Drawing Sheets

(51) Int. Cl.
*F02C 6/16* (2006.01)
*F02C 1/02* (2006.01)
*F02G 1/043* (2006.01)

(56) References Cited

U.S. PATENT DOCUMENTS

| | | | |
|---|---|---|---|
| 2010/0251711 A1* | 10/2010 | Howes | F01K 3/12 60/659 |
| 2010/0307156 A1 | 12/2010 | Bollinger | |
| 2011/0094212 A1 | 4/2011 | Ast | |
| 2012/0067047 A1* | 3/2012 | Peterson | C02F 1/22 60/651 |
| 2012/0079825 A1* | 4/2012 | Harif | F01K 25/02 60/645 |
| 2014/0338315 A1* | 11/2014 | Marks de Chabris | F02C 1/05 60/327 |

FOREIGN PATENT DOCUMENTS

| | | |
|---|---|---|
| JP | 9317495 A | 12/1997 |
| WO | 2011056296 A2 | 5/2011 |

* cited by examiner

SYSTEM FOR STORING ENERGY BY MEANS OF COMPRESSED AIR

STATEMENT OF RELATED APPLICATIONS

This patent application claims the benefit of International Patent Application No. PCT/EP2012/003704 having an International Filing Date of 5 Sep. 2012, which claims the benefit of German Patent Application No. DE102011112280.3 having a filing date of 5 Sep. 2011.

BACKGROUND OF THE INVENTION

1. Technical Field

The invention relates to a plant for storing energy by means of compressed air.

2. Prior Art

Initial State:

Fossil energy is to be replaced (owing to $CO_2$) with renewable energy. In the field of electricity supply, difficulties are posed by the fact that the availability of renewable energy, such as wind—utilized by means of wind turbines—and sun—utilized by means of photovoltaics—fluctuates greatly and the demand for electrical energy can be substantially covered by renewable energy only if the electricity generated thereby can be stored. Known methods for this are storage batteries—presently too expensive—pumped-storage power plants—these require relatively large height differences and do not exist for example in the North German lowlands, and furthermore often elicit public protests owing to "landscape degradation"—or compressed-air storage plans (often referred to in the literature as CAES—"Compressed Air Energy Storage").

These can store electrical energy on a large scale and, for this purpose, use underground cavities, large turbocompressors and turbines. Existing plants operate with the compressed air being heated, by means of natural gas combustion, before expansion in order to prevent the formation of ice in the turbine, and a further advanced approach (normally referred to as adiabatic compressed-air storage power plant or "adiabatic CAES") has the aim of storing the heat of compression released during the compression and releasing said heat again into the compressed air before the latter is expanded in the turbine. In this way, it is possible even in flat areas to store a very large amount of energy for electricity supply, without the landscape being changed, without the use of additional fossil energy, with good storage efficiency of approximately 70%, and at very low cost. The costs for the operation of such a plant are almost exclusively capital costs. And with greater use of renewable energies, these will only fall further.

This method is described in the documentation of the "ADELE" project, but something similar was planned as early as in the 1980s (→CAES Studies Pacific Northwest Labs 1981.pdf, Conceptual Design and Engineering Studies of Adiabatic Compressed Air Energy Storage (CAES) with Thermal Energy Storage, M. J. Hobson et. al., November 1981, Pacific Northwest Laboratory—Batelle, PNL-4115). In the ADELE project, technically high targets were set, with pressures of up to 100 bar and temperatures up to 600° C. in the heat store.

FIG. 1 describes the schematic construction of a known adiabatic compressed-air storage power plant. A compressed-air store is provided in a volume which is normally underground. To fill said compressed-air store, ambient air is introduced into the volume DS from atmospheric pressure p-atm, and through a heat store WS in which the air releases its heat of compression to a storage material, by means of a compressor K. Only low flow pressure losses are generated in the heat exchanger WS. The direction of the air is indicated by the dashed arrows. Here, an electric machine M/G, which can operate as a motor and as a generator, drives the compressor K via a switching coupling SK1 which is closed for this purpose. If the stored energy is to be called upon, air flows out of the compressed-air store DS through the heat store WS, where the stored heat of compression is substantially transferred back again, into a turbine T, and finally into the atmosphere. This is indicated by the solid arrows. The turbine T is connected to the electric machine M/G via a second switching coupling SK2, which is closed for this purpose, said electric machine now operating as a generator. Valves V ensure the necessary opening and closing processes.

The Object:

In order that said method of compressed-air storage can solve, with even greater effectiveness, the problem of homogenizing the availability of renewable energy, it must become cheaper. If gaps in renewable energy availability lasting for relatively long periods of time, for example for several days, are to be compensated for, it must be possible to build up storage capacity which is utilized not daily but rather a few times in a year and which, in the process, is depreciated. This is possible through improved utilization of a storage volume (at the cost of X Euro per $m_3$ geometric volume) with higher pressure and greater pressure fluctuations.

The same problem is encountered if it is sought to construct small stores in which the expensive initial investment of many millions of Euros for a bore into the ground is uneconomical, and which are thus dependent on small overground stores. Here, too, the capital costs of the plant per stored kWh of capacity are lower the higher the pressure and the higher the pressure fluctuations in the store are. Therefore, with regard to the existing projects, the following would still appear to have room for improvement:

If an underground storage volume is filled sometimes to a greater extent and sometimes to a lesser extent, then one encounters a fluctuating pressure therein (considerations have been made regarding pressure compensation using water, described for example in DE102007042837A1 and also in many earlier sources, but this was not realized owing to the difficulties associated with the water) and in the turbomachines that compress or expand compressed air, the flow conditions deviate from the design point, resulting in losses in efficiency. Therefore, the pressure fluctuations are limited to low values, the storage capacity of the volume is thus only partially utilized, more volume is thus required, and costs are higher.

In the cited DE102007042837A1, it is the intention for a high-pressure compressor designed specifically for fluctuating pressure to eliminate the problem using precisely such a turbine; another approach would be rotational speed regulation of the turbomachines in order, similarly to the approach with pump turbines of regulable rotational speed in pumped-storage power plants, to keep the velocity triangles approximately congruent and thus efficiency losses low—said approach then however has the disadvantage of the costs for cumbersome power electronics in the megawatt range and can only with difficulty provide the demand for so-called short-circuit current, as demanded in conventional electricity grids.

In a solution with only turbomachines, it is also difficult to realize high pressures for the good utilization of the storage volume, in particular in the case of less than 50 megawatt plant power.

The concept of the "pump turbine", that is to say the utilization of the same radial turbomachine both for pumping and for turbine operation (as realized in relatively new pumped-storage power plants, for example Goldisthal), is also already applied to compressed-air stores in JP000004347335A. Thus, a second possibility for improvement of the hitherto planned concepts is mentioned: capital costs can be lowered if one utilizes the same turbomachine both for compression and expansion.

Room for improvement also exists with regard to the starting time of a conventional compressed-air storage power plant. Owing to the high temperature fluctuations, there is a relatively long time between standstill and running at full load.

BRIEF SUMMARY OF THE INVENTION

The proposed solution:

A plant according to the invention for storing energy by means of compressed air is a plant for storing energy by means of compressed air, in which:

a storage volume accommodates air at elevated pressure $p_H$, for energy storage, ambient air is compressed and introduced into the storage volume, for removal from storage, compressed air is extracted from the storage volume and discharged into the environment, performing work, a turbomachine (low-pressure turbomachine), or multiple such machines, for alternate compression and expansion respectively compresses ambient air to a medium pressure $p_M$ and expands said ambient air from said pressure, a machine (high-pressure machine) for alternate compression and expansion respectively compresses air from the medium pressure $p_M$ to the store pressure $p_H$ and expands said air from the latter pressure, or multiple such machines connected in parallel in terms of flow perform said task, and said machines (low-pressure turbomachine and high-pressure machine) are connected in series in terms of flow and are mechanically coupled to in each case one, or to one common, generator/motor (that is to say an electric machine that operates selectively as a motor and generator).

DETAILED DESCRIPTION OF PREFERRED EMBODIMENTS

Figure 1:
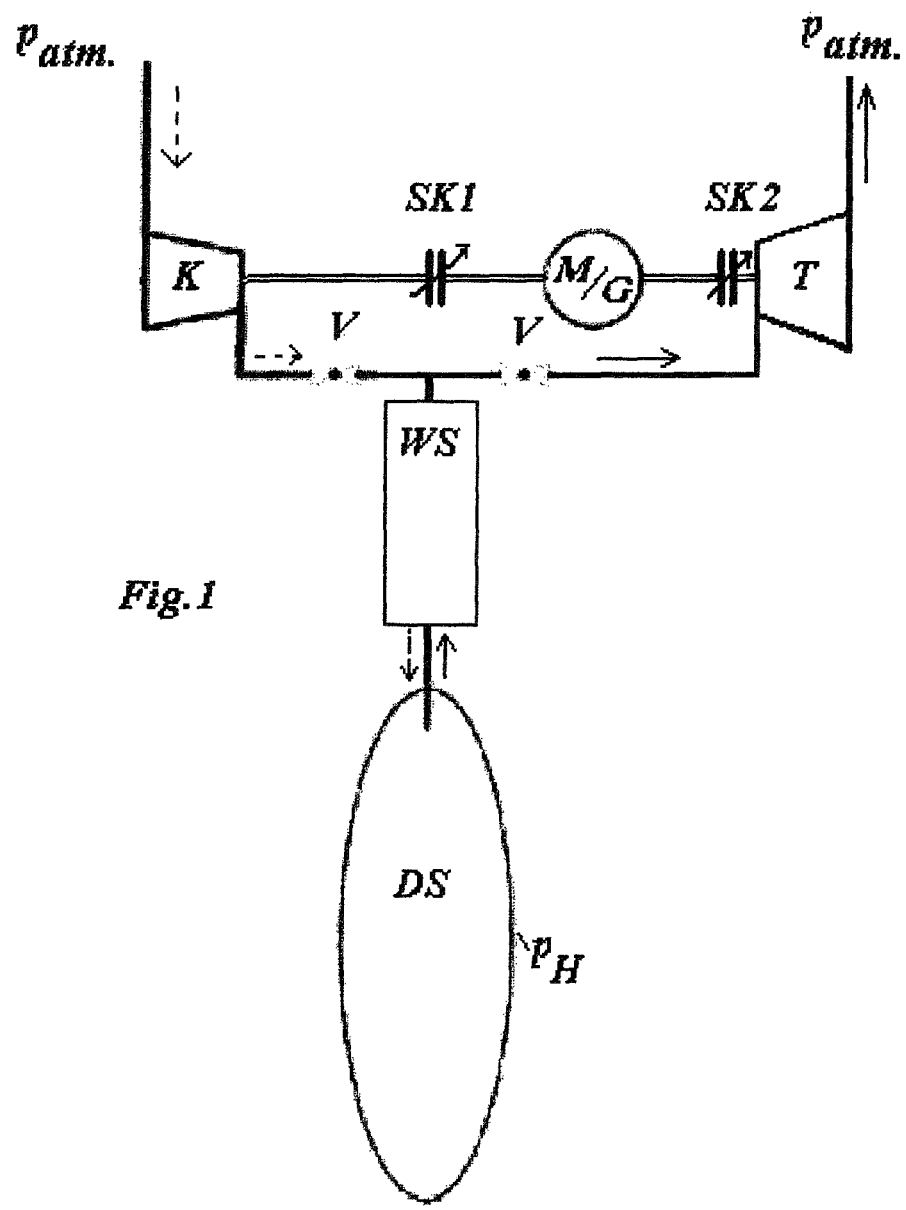
FIG. 1 describes the schematic construction of a known adiabatic compressed-air storage power plant.

It is the intention for the possibility of storing energy, in particular renewable energy, on the medium scale of approximately 1000 to 100,000 kWh using compressed air to be improved through the creation of a specific combination of machines which alternately compresses ambient air for the storage of energy and re-expands said compressed air for removal from storage. The storage costs are thus defined substantially by the production costs of the storage volume. The costs are reduced through good utilization of the storage volume by means of high-pressure and high pressure fluctuation. This is possible by means of a combination of a high-pressure machine (preferably high-pressure positive-displacement machine), in particular with regulable control timing, connected in series with a low-pressure turbomachine, wherein both operate as a compressor during storage and as an expansion machine during removal from storage.

It is advantageously the case that a low-pressure turbomachine with in particular multiple radial stages is coupled to a motor-generator and operates alternately as a compressor and as an expansion machine. The motor-generator is a three-phase machine, preferably a synchronous machine, which can be directly coupled to the country-wide electrical grid. A directional coupling (overrunning clutch) is provided as a connection between the low-pressure turbomachine and motor-generator.

The low-pressure turbomachine operates as a compressor and expansion machine and has no guide apparatus in the spiral. This is cheaper, at the expense of good regulability. It is thus preferable for the plant not to be regulated in terms of its power but rather typically completely started up and shut down. Spirals with guide apparatuses in a low-pressure turbomachine are referred to as outlet guide vanes in the case of radial turbocompressors or as a variable turbine geometry in the case of turbochargers.

The compressed air is stored at a maximum pressure $p_H$ in the range from 100-300 bar. The minimum pressure $p_H$ is less than ⅓ of the maximum pressure.

A high-pressure machine operates with the highly fluctuating pressure in the compressed-air store and with the medium pressure $p_M$ which is approximately constant independently thereof and which prevails between the high-pressure machine and the low-pressure turbomachine. The value of said pressure $p_M$ during expansion operation is approximately 1.1-1.3 times that during compression operation. $p_M$ can be briefly further increased, at the expense of efficiency, for brief periods of high power (for regulating purposes).

The high-pressure machine is also coupled to a three-phase machine as motor/generator, which three-phase machine can be connected to the country-wide electrical grid and designed as an asynchronous machine. The high-pressure machine may be a turbomachine, radial turbomachine, a positive-displacement machine, a screw-type compressor, a piston machine or some other compression-expansion machine. A piston machine with a fixed rotational speed and variable valve timing is preferable.

It is advantageous for a bypass line past the high-pressure machine to be provided in order that, in the event of a fast start-up, the volume in the low-pressure region can be charged quickly from the compressed-air store. The bypass line should be regulated owing to the risk of positive pressure in the low-pressure region. A safety valve is preferably provided. The bypass line is furthermore expedient when the compressed-air store is ready substantially empty and the low-pressure turbomachine briefly requires elevated pressure $p_M$.

The low-pressure turbomachine and the high-pressure machine have closed-off heat stores for absorbing the heat of compression. The low-pressure turbomachine, during compression operation, preferably releases the heat of compression in multi-stage fashion as medium-temperature heat, of at most 250°, 300°, 350° or 400° C., to heat stores. From there, the heat of compression is transferred back in multi-stage fashion during expansion operation.

The heat stores of the high-pressure machine preferably exhibit lower temperatures, can be partially traversed by air and are partially connected to lubricant or coolant circuits.

For the compressed air, a value of 15-30% of the maximum store pressure PH1 is sought as pressure $p_M$. In the case of a store pressure of 200 bar, the pressure $p_M$ is thus approximately 30-60 bar. The high-pressure machine, in particular positive-displacement machine, can thus operate in single-stage fashion in an effective manner and has, in the case of approximately 50 bar $p_M$ and maximum store pressure $P_{H1}$ of 200 bar, only approximately ¼ of the total power of the plant. The major part of the energy conversion takes place in the low-pressure turbomachine with good efficiency, at lower cost per kW, and virtually without wear. Smaller plants or plants with lower pressures are also possible, for example with a medium pressure $p_M$ of 11 bar and a maximum high pressure $P_{H1}$ of 50 bar.

To realize high pressures with medium power, one makes use, for other applications, of a combination of turbomachine for the low-pressure range and piston machine for the high-pressure range, as is the case for example in turbodiesel engines. Said concept is also not entirely new in the case of compressed-air storage power plants, cf. US000004281256A (in which, however, use is made of an internal combustion engine; and there is no discussion of adaptation to fluctuating pressures). One realization according to the invention consists in that positive-displacement machines such as, for example, a piston machine are not only well suited to high pressures but can also be adapted in an effective manner to fluctuating pressures in the air store by adaptation of the control timing for the discharging of air from the working chambers into the high-pressure region during compression and for the charging of the working chambers with air from the high-pressure region during expansion.

It is thus sought to connect a turbomachine for alternate compression and expansion of air in the low-pressure region to a positive-displacement machine for alternate compression and expansion in the high-pressure region, wherein said positive-displacement machine operates in particular with variable control timing.

The turbomachine for the low-pressure region is preferably a multi-stage radial machine which has an integrated gear-wheel-type transmission gearing and which provides more than half of the compression power, rotates at a fixed rotational speed and is coupled to a synchronous machine (which operates alternately as a motor and as a generator) which is connected directly to the electrical grid. Heat storage takes place in multi-stage fashion, firstly in two-stage fashion at the low-pressure turbomachine, at a temperature level of at most approximately 200-400° C., secondly with the cooling or the lubricating medium of the positive-displacement machine at approximately 60-100° at most, and then once again in the high-pressure region between positive displacement machine and store at a temperature level of 150 to 250° C. at most. The piston machine (as positive-displacement machine for the high-pressure region) is likewise coupled to a motor-generator, preferably to a three-phase machine, which is likewise directly connected to the electrical grid.

One difficulty remains: if a radial turbomachine such as, for example, a turbocompressor is to be used both as an expansion machine and also as a compressor machine, then it has different optimum rotational speeds Sigma during compression and during compression (cf. Cordier diagram). For a constant pressure $p_M$ between the turbomachine and the positive-displacement machine, the rotational speed of the turbomachine would have to be slightly lower during expansion operation than during pumping operation. For a simple, inexpensive construction of the machine plant, however, direct coupling to the electrical grid and thus a constant rotational speed (as in the case of synchronous machines, or at least approximately (+/−5%) constant rotational speed, as in the case of asynchronous machines) is advantageous. The proposed solution uses a pressure $p_M$ that differs slightly during compression operation and expansion operation; said pressure may be kept approximately 15 to 25% higher during expansion operation than during compression operation.

If there is a demand for the power output into the electrical grid by the overall plant to be briefly increased at the expense of efficiency but with the advantage of lower capital costs (per kW maximum output power), the pressure $p_M$ can be raised yet further up to the point of direct connection of the storage volume to the turbomachine ($p_H=p_M$, at the time when the store pressure $p_H$ is already close to the minimum value and thus the compressed-air store is almost empty; such a bypass line past the positive-displacement machine, if appropriate with a throttle valve, could also serve for brief power increase or for start-up acceleration).

During the expansion in multiple pressure stages, the stored heat of compression is supplied to the compressed air. In plants for long-term storage in which large heat stores adequate for the entire stored amount of compressed air would be utilized only rarely in the space of a year and in which said heat stores would therefore be designed to be smaller in order to save costs, an additional supply of heat can be performed by means of auxiliary combustion. In the case of auxiliary combustion, the concept of transferring waste heat by means of a heat exchanger from the expanded compressed air into compressed air which is not yet expanded, or not yet completely expanded, is also obvious.

As a positive-displacement machine, use may be made of a piston machine whose control valves (or control slides) permit varying charging and discharging timing on the high-pressure side. In the case of relatively large pressure ratios to be overcome (for example 10 to 200 bar gauge), said machine may also be a two-stage machine in which, if appropriate, only the working chambers provided for the relatively high pressure are equipped with such adjustable control valves. Adjustability of all control valves is however likewise conceivable.

In particular, in the case of extensive adjustability both of the control valves for the higher pressure level and of those for the low pressure level, it would be possible for the piston machine to be changed over from expansion operation to compression operation and vice versa with the rotational speed being kept the same, that is to say without a change in the direction of rotation, which permits particularly fast load changes. Such fast load changes will also be facilitated by the low temperature level and accordingly low thermal stresses.

In the course of such considerations, it is mentioned that, for this purpose, it would also be possible for a connection of the turbomachine to the motor-generator to be provided which operates with a switching coupling and/or a reversing gear and/or a directional coupling, usually referred to as overrunning clutch or freewheel. It is thus possible, for example, with the electric machine rotating uninterrupted in one direction and at a rotational speed (with the turbomachine at a standstill, utilization at idle as a phase shifter is possible, stabilization of the network by means of additional rotating mass), for the turbomachine to be started up very quickly in expansion operation and connected to said electric machine, for the purpose of outputting power, by means of the overrunning clutch.

In the case of a coupling that can be switched under load, the same action would be possible during start-up as a compressor. With a reversing gear and coupling that can be switched under load, switching of the turbomachine from expansion operation to compression operation with a reversal of the direction of rotation of the turbomachine would also be possible with the electric machine rotating uninterrupted in one direction.

The possibility is also mentioned of using, as a positive-displacement machine, a screw-type machine with control slide, a vane-type machine with adjustable axle position, a multi-piston machine similar to axial piston machines with adjustable oblique axle from the field of hydraulics, a screw-type spindle machine similar to those from vacuum technology (in this case with a pitch that decreases from the suction side to the pressure side and with activatable slots for a connection of the working chamber to the higher pressure level $p_H$ in the case of higher working chamber volume), or an arrangement such as "BOP-B" from Prof. Rufer and Mr. Cyphelli. It would be going too far to list here all positive-displacement machines with adjustable charging in expansion operation.

Also conceivable is the use of a positive-displacement machine, which is regulable in terms of rotational speed, in combination with a turbomachine which is not regulable in terms of rotational speed, or the use of a reciprocating-piston machine whose pistons are driven not via crankshaft and connecting rods but rather by means of an electric or hydraulic linear drive—with the associated possibility of a variable stroke and/or variable stroke frequency. Likewise conceivable is the use of multiple positive-displacement machines for the high-pressure region, connected in parallel with one another, connected in series with a turbomachine for the low-pressure region (wherein the number of positive-displacement machines running in each case can be adapted to the desired compressed-air mass flow).

In this way, too, it is possible for the pressure $p_M$ to be kept approximately constant despite fluctuating pressure in the store $P_H$. Expressed in technical terms, during the expansion, the volumetric displacement per unit of time of the positive-displacement machine(s) connected upstream of a low-pressure turbomachine is regulated such that the compressed-air mass flow remains constant in the case of varying inlet pressure $p_H$. The expression "volumetric displacement" denotes the volume of the sum of the working chambers of the positive-displacement machine(s) at the end of the charging process, in this case, during the expansion, upon the closure of the working chamber with respect to the pressure $p_H$. With such regulation of the number of running positive-displacement machines, likewise in the case of rotational speed regulation of a positive-displacement machine with fixed control timing or cylinder deactivation in a positive-displacement machine, efficiency is lower than in the case of a variation of the control timing, though a cost advantage could be achieved.

Likewise conceivable is the arrangement of multiple radial turbomachines, the delivery rate of which can normally be regulated only to a small extent, in parallel with one another, such that fluctuating power demands can be responded to through the deactivation and activation of individual turbomachines. Said turbocompressors would output work on a common medium pressure air line to which multiple high-pressure positive-displacement machines are connected.

To realize expansion power lower or considerably higher than the compressor power, it is also possible to develop an energy store plant in which machines for alternate compression and expansion also have connected in parallel therewith machines that can operate only as a compressor or only as an expansion machine.

The auxiliary combustion in a (piston-type) positive-displacement machine in the event of inadequate capacity of the heat store may also be realized by virtue of the combustion in the working chamber taking place, similarly to that in a diesel engine, in the time period between the injection of the fuel (oil or high-pressure natural gas) and the end of the expansion stroke. The difference with respect to the method described in US000004281256A consists firstly in that, here, variable pressure prevails in the air store and variable valve control timing is provided, and secondly in the use of the same low-pressure turbomachine for compression and expansion.

Also mentioned is the possibility of an arrangement composed of low-pressure turbomachines and high-pressure piston machine firstly interacting with a compressed-air store (with or without internal combustion) as an energy store plant, and secondly, in the event of relatively long gaps in renewable energy (without drawing upon the then empty compressed-air store), as a turbodiesel engine. For this purpose, 2 turbomachines would be necessary which, in storage operation, both operate alternately as compressor and turbine; in operation as a turbodiesel engine, one turbomachine would have to act as a turbocompressor, and the other as a turbine. Here, the two turbomachines act as the exhaust-gas turbocharger, and the high-pressure piston machine acts as the combustion machine of a turbodiesel engine.

Below, there will be no discussion of possibly required screens, filters, dirt capturing magnets for rust and tinder generated in the pipes and oil separators in the pipes for the compressed air, and there will likewise be no discussion of the condensation water separators required at the cold end of heat stores.

It is pointed out that the arrangement composed of a high-pressure positive-displacement machine and of a low-pressure turbomachine for alternate compression and expansion could also be coupled in an effective manner to a drive shaft which is regulable in terms of rotational speed, such as is provided in a wind turbine, for example of the widely used Fuhrländer F1500 type.

The following relationship applies: low wind speed—low wind power—low rotational speed of the wind turbine—low rotational speed of the low-pressure turbomachine connected to the drive shaft of the wind turbine via a gearing—low pressure $p_M$—the high-pressure positive-displacement machine can nevertheless store compressed air counter to a high store pressure—and— high wind speed—high wind power—high rotational speed of the wind turbine—high rotational speed of the low-pressure turbomachine connected to the drive shaft of the wind turbine via a gearing—high pressure $p_M$—the high-pressure positive-displacement machine can store a large amount of compressed air owing to high pressure $p_M$—here, controllable valve timing during the compression is crucial for good efficiency in the case of fluctuating pressures $p_H$ and $P_M$. It would thus be possible for wind energy to be delivered as compressed air into stores.

During the removal from storage, the same combination of low-pressure turbo compressor could likewise be utilized: the high-pressure positive-displacement machine operates as an expansion machine, the low-pressure turbomachine operates in the opposite direction of rotation to the expansion machine, a generator conventionally installed in such wind turbines conducts the energy into the electrical grid; connected for example via a coupling and reversing gear to the expansion machines, cf. also DE102008057776A1.

Further features of the invention will emerge from the rest of the description and from the claims.

Figure 2:
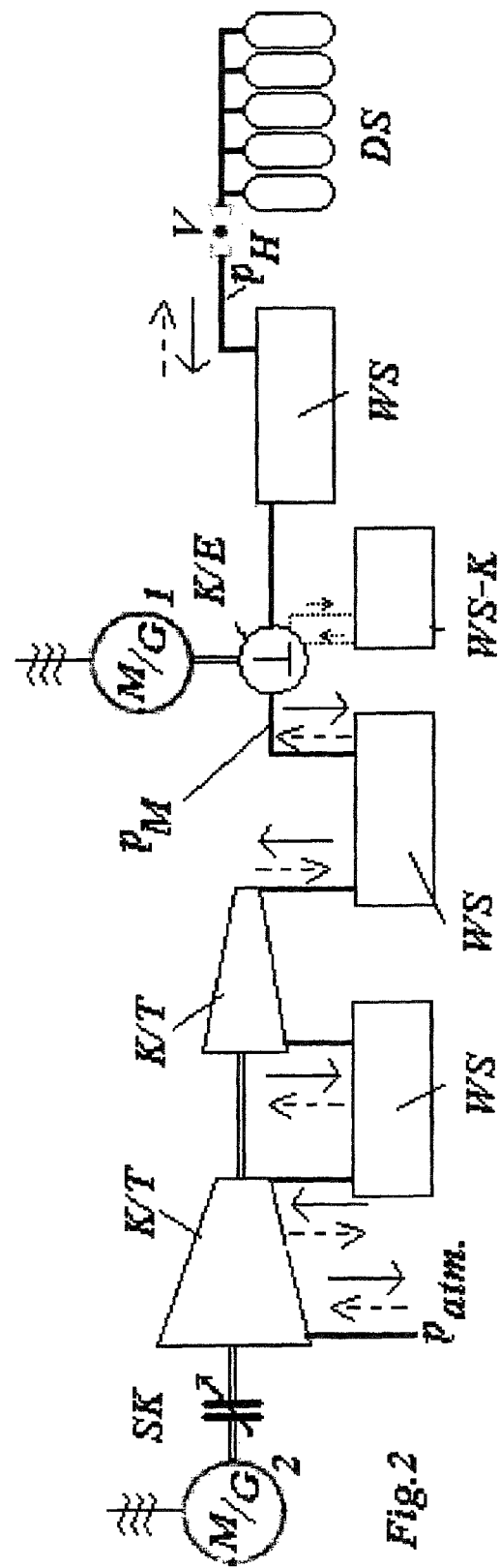
FIG. 2 schematically shows the construction of an advantageous compressed-air energy storage plant according to the invention.

FIG. 2 schematically shows the construction of an advantageous compressed-air energy storage plant according to the invention.

In the compressed-air store DS, formed by multiple tanks connected in parallel, an elevated pressure $p_H$ prevails. As pressure stores, aside from steel pressure tanks, use may also be made here of underground salt caverns or pore gas stores for large-scale applications, or else of compressed-gas bottles for small-scale applications. To charge the compressed-air store DS, ambient air is raised from atmospheric pressure $p_{atm}$ to a medium pressure $p_M$ of 10 bar in two-stage fashion by means of a low-pressure turbomachine of radial type of construction, K/T, which can operate as a compressor and as a turbine.

Said medium pressure is kept virtually constant independently of the pressure $p_H$ in the store. Here, the heat of compression is stored in two-stage fashion in heat stores WS. A positive-displacement machine K/E, which can operate as a compressor and as an expansion machine, then compresses the air to the store pressure $p_H$, which in normal operation is raised from a minimum value $p_{H2}$ of 20 bar to a maximum value $p_{H1}$ of 100 bar. Upstream of the inlet into the compressed-air store DS, heat of compression is once again released into a heat store WS. The path of the air is indicated by dashed arrows.

The switching coupling SK is a directional coupling, also referred to as overrunning clutch, which is closed or open depending on the direction of rotation of the shaft torque. Said coupling is closed during compression, and likewise when the low-pressure turbomachine operates, in the reverse direction of rotation, as a turbine. As a positive-displacement machine, a conventional piston machine with a crank drive is provided, and as an electric machine M/G$_1$ connected thereto, there is provided by way of precaution a three-phase asynchronous machine in order that rotational irregularities are not transmitted inflexibly to the electrical grid.

In the combination of synchronous machine on the turbomachine+asynchronous machine, the synchronous machine supplies the asynchronous machine with wattless power. Both machines M/G are connected to the country-wide three-phase electrical grid without interconnected power electronics. The rotational speed thus remains constant aside from slippage effects. With this arrangement, black start capability and a high short-circuit current can be realized inexpensively.

During compression operation, the air temperature at the inlet into the heat store is in the range from 200-300° C. As a result, the demands on the heat store can be met more easily and the thermal stresses in the machines remain low. The positive-displacement machine K/E is connected to a heat store for coolant or a lubricant (lines for this purpose are shown by dotted lines) WS-K, which heat store, during the compression, is also charged with heat of compression, but to a lower temperature level of up to 100°.

After the charging of the store, the machines are brought to a standstill. For preparation for a fast start-up, the electric machine M/G$_2$ that is connected to the low-pressure turbomachine, said electric machine being a three-phase synchronous machine, can be set in operation in the reverse direction and synchronized with the grid. In the process, the overrunning clutch automatically opens and will automatically close when the low-pressure turbomachine reaches the synchronous rotational speed upon start-up.

During the expansion, the compressed air flows in the opposite direction, as indicated by the solid arrows. The compressed air absorbs stored heat of compression from the heat stores WS. The pressure $p_M$ is kept approximately constant at approximately 12 bar independently of the pressure $p_H$. This yields, in the turbomachine K/T, a slightly higher value for the stage rotational speed Sigma than during the compression, which, in accordance with the Cordier diagram, promotes efficiency.

Figure 3:
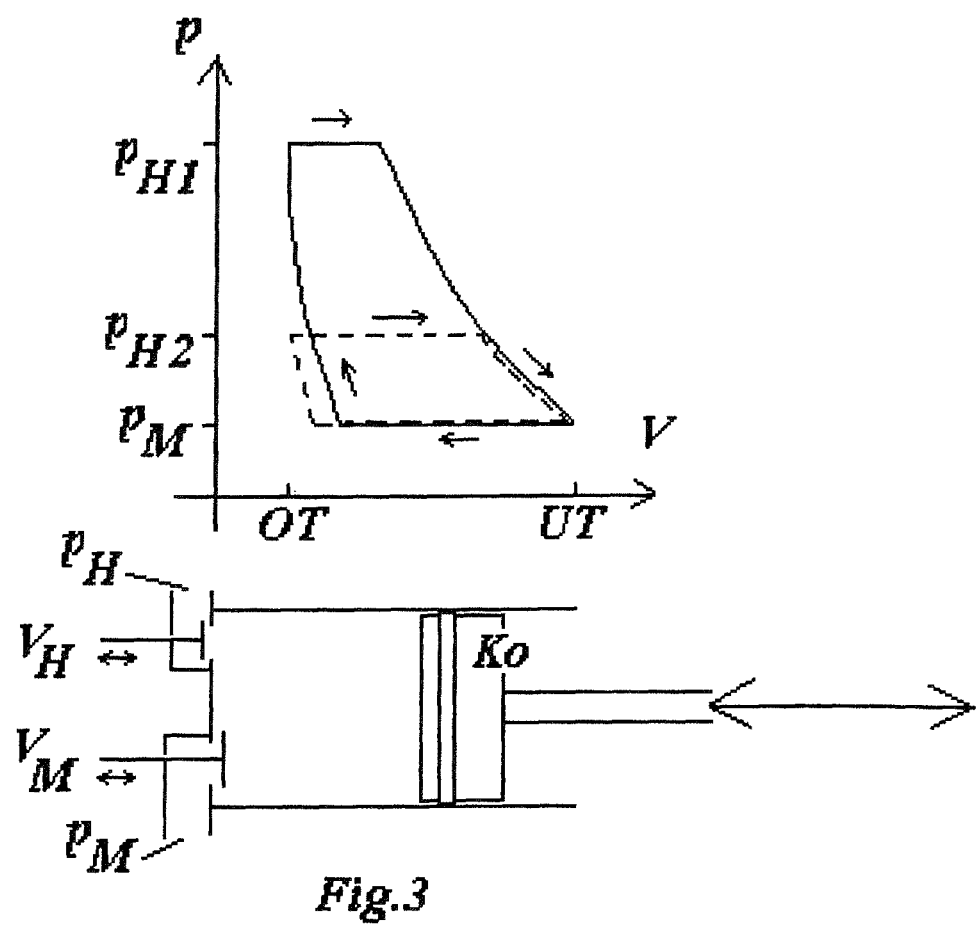
FIG. 3 shows a piston Ko which moves back and forth in a cylinder between top dead centre OT and bottom dead centre UT. The upper part of FIG. 3 shows a schematic p-V diagram for the expansion process, both for the high store pressure $p_{H1}$, solid line, and for the low store pressure $p_{H2}$, dashed line.

An approximately constant value for $p_M$ independently of $p_H$ is achieved by means of varying charging of the working chamber and the positive-displacement machine, as shown in FIG. 3. Said figure shows a piston Ko which moves back and forth in a cylinder between top dead centre OT and bottom dead centre UT. The connections of the working chamber to the store pressure $p_H$ and to the medium pressure $p_M$ are opened and closed by means of valves VH and VM during every crank rotation.

The upper part of FIG. 3 shows a schematic p-V diagram for the expansion process, both for the high store pressure $p_{H1}$, solid line, and for the low store pressure $p_{H2}$, dashed line. In the case of the low store pressure, the valve VH first closes when there is a relatively large volume of the working chamber and the cylinder. In this example, the valve VM also has varying control timing. During the compression, the p-V diagram is run through in the opposite direction, and in that case, too, an adaptation of the valve timing to the pressure $p_H$ is expedient for improved efficiency.

If the electrical grid ruefully requires more power for regulating purposes, the charging of the positive-displacement machine is further increased, the throughput of compressed air becomes larger, the pressure $p_M$ can rise to 18 bar.

Such a compressed-air energy storage plant, which is constructed from known and inexpensive machine types and which is therefore easy to develop, has only a small range of regulation owing to the limited regulability of a conventional radial turbomachine without guide vanes in the spiral, in any case in compressor operation, and efficiency would be not expedient at part load in turbine operation.

However, in the case of an energy storage plant size of 5 megawatts, a wind farm of 100 MW rated power would be combined with approximately 5 such compressed-air energy storage plants. The power fluctuation of the wind farm of 100 MW rated power can then be homogenized in an effective manner by stepped activation and deactivation of such storage plants.

What is claimed is:

1. A plant for storing energy by means of compressed air, in which:
    a storage volume accommodates air at elevated store pressure $p_H$;
    for energy storage, ambient air is compressed and introduced into the storage volume;
    for removal from storage, compressed air is extracted from the storage volume and discharged into the environment, performing work;
    at least one low-pressure turbomachine for alternate compression and expansion respectively compresses ambient air to a medium pressure $p_M$ and expands said ambient air from said medium pressure $p_M$;
    at least one high-pressure machine for alternate compression and expansion respectively compresses air from the medium pressure $p_M$ to the store pressure $p_H$ and expands said air from the store pressure $p_H$, wherein if there are a plurality of such high-pressure machines, then the plurality of such high-pressure machines are connected in parallel in terms of flow perform said task; and
    said at least one low-pressure turbomachine and said at least one high-pressure machine are connected in series in terms of flow and are mechanically coupled to in each case one, or to one common, generator/motor, wherein the generator/motor is an electric machine that operates selectively as a motor or a generator, wherein the at least one low-pressure turbomachine has a fixed rotational speed or a virtually fixed rotational speed both during expansion and during compression, said rotational speed being defined by the frequency in a country-wide electrical grid, wherein the at least one low-pressure turbomachine provides more than half of a compression power of the at least one low-pressure turbomachine and the at least one high-pressure turbomachine combined, wherein the store pressure $p_H$ can be changing from between a minimum store pressure $p_{H2}$ and a maximum store pressure $p_{H1}$, wherein the medium pressure $p_M$ is kept constant irrespective of the changing store pressure $p_H$ during loading the storage volume, and also during discharging the storage volume in normal operation, except for short overload periods with increased $p_M$, and wherein the medium pressure $p_M$ during normal expansion operation amounts to between 1.05 times and 1.3 times the value of $p_M$ during compression operation.

2. The plant as claimed in claim 1, wherein the at least one high-pressure machine is a positive-displacement machine.

3. The plant as claimed in claim 1, wherein the at least one high-pressure machine is a positive-displacement machine with a store-pressure side and a medium-pressure side and is constructed such that, on the store-pressure side, during expansion operation the at least one high-pressure machine closes a connection from the storage volume at the store pressure $p_H$ to a working chamber at varying working chamber volume, and during compression operation the at least one high-pressure machine opens the connection from the working chamber to the storage volume at the store pressure $p_H$ at varying working chamber volume, and thus permits different working chamber charges during expansion operation and different discharge timing during compression operation.

4. The plant as claimed in claim 1, wherein the minimum store pressure $p_{H2}$ in normal storage operation amounts to less than one third of the maximum store pressure $p_{H1}$, and the medium pressure $p_M$ is kept equal in each case independently of the store pressure $p_H$ during expansion and compression by control of the at least one high-pressure machine.

5. The plant as claimed in claim 1, wherein the at least one low-pressure turbomachine has a virtually fixed rotational speed having a deviation of +/−5% both during expansion and during compression.

6. The plant as claimed in claim 1, comprising multi-stage heat storage and maximum temperatures of between 200° and 400° C.

7. The plant as claimed in claim 2, wherein, in the positive-displacement machine, during operation, a mechanical, power-transmitting element is moved, owing to the construction of the drive and independently of the store pressure, with always approximately the same frequency and with a deviation of up to +/−5%.

8. The plant as claimed in claim 1, comprising at least one directional coupling, between the generator/motor and the low-pressure turbomachine coupled thereto or between the generator/motor and the high-pressure machine coupled thereto.

9. The plant as claimed in claim 6, wherein the exchange of heat for the multi-stage heat storage takes place in intermediate stages of the at least one low-pressure turbomachine.

10. The plant as claimed in claim 6, wherein the exchange of heat for the multi-stage heat storage takes place between the at least one low-pressure turbomachine and the at least one high-pressure machine.

11. The plant as claimed in claim 6, wherein at least one of the at least one high-pressure machine is a positive-displacement machine, and wherein the exchange of heat for the multi-stage heat storage takes place in the positive-displacement machine.

12. The plant as claimed in claim 6, wherein the exchange of heat for the multi-stage heat storage takes place in a lubricant circuit of a positive-displacement machine.

13. The plant as claimed in claim 6, wherein the exchange of heat for the multi-stage heat storage takes place between the at least one high-pressure machine and the storage volume.

14. The plant as claimed in claim 1, wherein the plant operates without any combustion in normal operation.

15. The plant as claimed in claim 1, wherein the medium pressure $p_M$ is a value of 15-30% of the maximum store pressure $p_{H1}$, such that the at least one low pressure turbomachine provides more than half of the compression power of the plant.

16. The plant as claimed in claim 1, wherein the at least one low-pressure turbomachine has a spiral without any guide apparatus.

17. The plant as claimed in claim 2, wherein in the positive-displacement machine, at least during expansion operation, different volumetric displacements per unit of time can be set.

* * * * *